United States Patent Office 2,745,717
Patented May 15, 1956

2,745,717
PREPARATION OF POLYPHOSPHATES

James W. Edwards, Dayton, Ohio, assignor to Monsanto Chemical Company, St. Louis, Mo., a corporation of Delaware No Drawing. Application April 23, 1953,
Serial No. 350,770

3 Claims. (Cl. 23—106)

This invention relates to the preparation of phosphate salts and, more particularly, to the preparation of sodium tripolyphosphate, $Na_5P_3O_{10}$. The invention especially relates to that form of sodium tripolyphosphate known as Form I sodium tripolyphosphate, $Na_5P_3O_{10}$ (I).

Sodium tripolyphosphate is a well known commercially available material enjoying a widespread use a water-softening agent, especially as a so-called builder in formulations with soaps and synthetic detergents. The compound can be prepared in various ways, one of which is by the cooling of a fused mixture of equimolar proportions of tetrasodium pyrophosphate, $Na_4P_2O_7$, and sodium metaphosphate, $NaPO_3$. Another method involves the heating to about 200 or 300° C. or higher of a dry mixture of two mole proportions of disodium hydrogen orthophosphate, $Na_2HPO_4$, and one mole proportion monosodium dihydrogen orthophosphate, $NaH_2PO_4$. The chemical reactions involved in the foregoing preparations may be expressed as follows:

$$Na_4P_2O_7 + NaPO_3 \rightarrow Na_5P_3O_{10}$$
$$2Na_2HPO_4 + NaH_2PO_4 \rightarrow Na_5P_3O_{10} + 2H_2O$$

Sodium tripolyphosphate is known to be a polymorphic material, of which at least two separate and distinct solid forms have been identified. These forms are commonly referred to as Form I and Form II, and are designated by the formulae: $Na_5P_3O_{10}$ (I) and $Na_5P_3O_{10}$ (II). (See Partridge et al., Journ. Amer. Chem. Soc., volume 63, page 454 et seq.) The Form I sodium tripolyphosphate is usually referred to as the "high temperature" form. This designation arises from the fact that prior to the present invention there was no way known by which the Form I sodium tripolyphosphate could be made at temperatures below about 500° C. or 550° C., whereas the Form II material could be made at temperatures as low as 200° C. or 300° C.

I have now discovered a novel method of preparation of sodium tripolyphosphate salts, which method has the outstanding advantage that the Form I sodium tripolyphosphate can be formed at relatively low temperatures. More specifically, I have now discovered that $Na_5P_3O_{10}$ (I) can be prepared from trisodium hydrogen pyrophosphate, $Na_3HP_2O_7$, and disodium hydrogen orthophosphate at temperatures as low as about 200° C.

This invention is carried out merely by mixing the solid reactants, preferably in about equimolar proportions, and heating the mixture to a temperature greater than about 200° C. The time required for the reaction to take place will vary somewhat depending upon the degree of subdivision of the solid reactants and the intimacy of admixing thereof, as well as upon the temperature to which the mixture is heated. As would be expected, less time is required at higher temperatures and for more intimate admixtures of the solid reactants. As indicated above, appreciable yields of sodium tripolyphosphate and particularly the Form I sodium tripolyphosphate are formed above about 200° C., but it is preferable to heat above about 250° C. or 300° C. It is seldom necessary to heat the mixture above about 450° C. or 500° C., although higher temperatures can be utilized if desired.

The following examples are illustrative of the preparation of the present invention.

Example 1

Equimolar proportions of trisodium hydrogen pyrophosphate (monohydrate) and disodium hydrogen orthophosphate (dihydrate) were pulverized with a mortar and pestle until the materials would pass through a 325-mesh screen, then they were intimately admixed and heated in a furnace for 2 hours at 250° C. Analysis by means of X-ray diffraction utilizing a Geiger counter X-ray diffractometer showed that over 60 per cent of the mixture had been converted to sodium tripolyphosphate, of which over 75 per cent was $Na_5P_3O_{10}$ (I).

Example 2

Equimolar proportions of trisodium hydrogen pyrophosphate (monohydrate) and disodium hydrogen orthophosphate (anhydrous) were prepared as in Example 1 and heated at 350° C. for about 1 hour. Analysis by means of X-day diffraction utilizing a Geiger counter X-day diffractometer showed the product to contain approximately 80 percent of Form I sodium tripolyphosphate, $Na_5P_3O_{10}$.

I claim:

1. The method of preparing $Na_5P_3O_{10}$ (I) which comprises heating a mixture of trisodium hydrogen pyrophosphate and disodium hydrogen orthophosphate at a temperature between about 200° C. and about 500° C.

2. The method of preparing $Na_5P_3O_{10}$ (I) which comprises heating a mixture of crystalline trisodium hydrogen pyrophosphate and crystalline disodium hydrogen orthophosphate at a temperature between about 250° C. and about 500° C.

3. The method of preparing $Na_5P_3O_{10}$ (I) which comprises heating equimolar proportions of crystalline trisodium hydrogen pyrophosphate and crystalline disodium hydrogen orthophosphate at a temperature between about 250° C. and about 450° C.

References Cited in the file of this patent

UNITED STATES PATENTS 1,972,032　　Reimann _____ Aug. 28, 1934

FOREIGN PATENTS 441,474　　Great Britain _____ Jan. 20, 1936

OTHER REFERENCES

Mellor: "Comprehensive Treatise on Inorganic and Theoretical Chemistry," vol. 2, page 685, Longmans, Green and Co., New York, 1922.

Partridge: "Thermal, Microscopic and X-ray Study of System $NaPO_3$—$Na_4P_2O_7$," Journal of American Chemical Society, vol. 63, pages 454–466, February 1941.